United States Patent [19]

Taylor et al.

[11] 4,253,183

[45] Feb. 24, 1981

[54] METHOD AND APPARATUS FOR DIAGNOSING FAULTS IN A PROCESSOR HAVING A PIPELINE ARCHITECTURE

[75] Inventors: Allen G. Taylor, Westminster; Robert E. Cichon, San Diego; Wayne J. Lewis, Escondido, all of Calif.

[73] Assignee: NCR Corporation, Dayton, Ohio

[21] Appl. No.: 35,154

[22] Filed: May 2, 1979

[51] Int. Cl.³ ............................................. G06F 11/00
[52] U.S. Cl. ..................................... 371/16; 364/200; 371/29
[58] Field of Search .................... 371/16, 29; 364/200, 364/900

[56] References Cited

U.S. PATENT DOCUMENTS

| | | | |
|---|---|---|---|
| 3,518,413 | 6/1970 | Holtey | 371/16 |
| 3,688,263 | 8/1972 | Balogh, Jr. et al. | 371/16 |
| 3,736,566 | 5/1973 | Anderson et al. | 364/200 |
| 3,771,131 | 11/1973 | Ling | 364/200 |
| 3,831,148 | 8/1974 | Greenwald et al. | 364/200 |
| 3,964,088 | 6/1976 | Ducrocq et al. | 364/200 |

*Primary Examiner*—Charles E. Atkinson
*Attorney, Agent, or Firm*—J. T. Cavender; Edward Dugas; Stephen F. Jewett

[57] ABSTRACT

A processor having a pipeline architecture is comprised of a plurality of replaceable circuit units and includes a snapshot circuit associated with each replaceable circuit unit. Each snapshot circuit has a snapshot register for storing the signals at test points in its associated replaceable circuit unit in response to either an immediate snapshot command or a delayed snapshot command being executed by a processor. A command-under-test passing through the processor results in the signals at the test points. The delayed snapshot command delays the storing of the signals by the snapshot register so that by preceding the command-under-test by a delayed snapshot command, the signals at test points in the execute stage of the processor are stored during the execution of the command-under-test.

8 Claims, 6 Drawing Figures

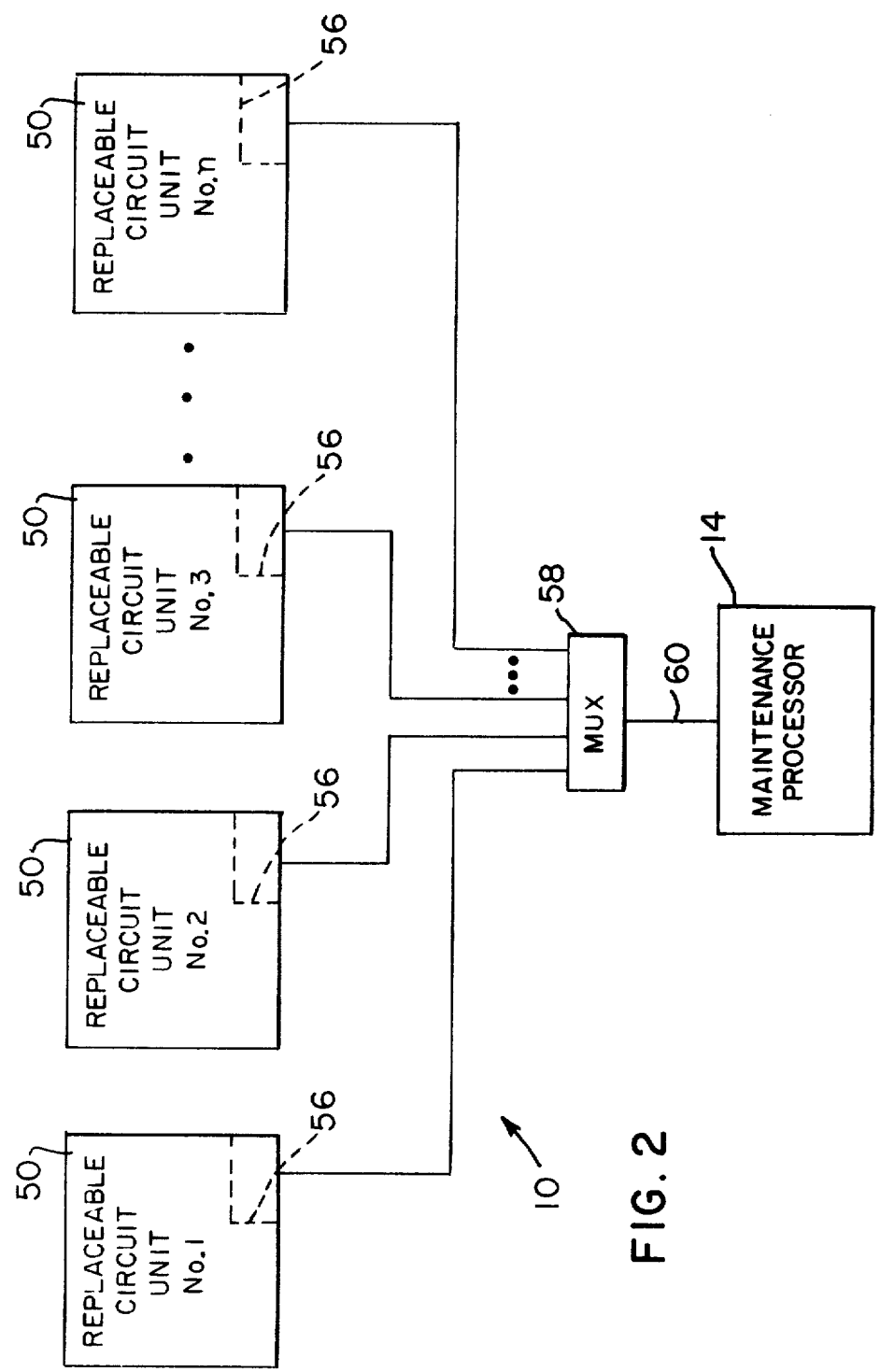

FIG. 3A

|    | FETCH | INTERPRET | EXECUTE | MARS | DAT | CACHE |
|----|-------|-----------|---------|------|-----|-------|
| $t_1$ | CUT   | SNP       | SNP     |      |     |       |
| $t_2$ | SNP   | CUT       | SNP     | SNP  |     |       |
| $t_3$ | SNP   | SNP       | CUT     | SNP  | SNP |       |
| $t_4$ | SNP   | SNP       | SNP     | CUT  | SNP | SNP   |
| $t_5$ |       | SNP       | SNP     | SNP  | CUT | SNP   |
| $t_6$ |       |           | SNP     | SNP  | SNP | CUT   |

CUT – COMMAND UNDER TEST
SNP – SNAPSHOT COMMAND

FIG. 3B

|    | FETCH | INTERPRET | EXECUTE | MARS | DAT | CACHE |
|----|-------|-----------|---------|------|-----|-------|
| $t_0$ | $SNP_D$ | $SNP_D$ | $SNP_D$ |        |        |        |
| $t_1$ | CUT     | $SNP_D$ | $SNP_D$ | $SNP_D$ |        |        |
| $t_2$ | SNP     | CUT     | $SNP_D$ | $SNP_D$ | $SNP_D$ |        |
| $t_3$ | SNP     | SNP     | CUT     | $SNP_D$ | $SNP_D$ | $SNP_D$ |
| $t_4$ | SNP     | SNP     | SNP     | CUT     | $SNP_D$ | $SNP_D$ |
| $t_5$ |         | SNP     | SNP     | SNP     | CUT     | $SNP_D$ |
| $t_6$ |         |         | SNP     | SNP     | SNP     | CUT     |

$SNP_D$ – DELAYED SNAPSHOT COMMAND

METHOD AND APPARATUS FOR DIAGNOSING FAULTS IN A PROCESSOR HAVING A PIPELINE ARCHITECTURE

BACKGROUND OF THE INVENTION

The present invention relates to diagnosing faults in a data processing system, and more particularly, to diagnosing faults in a processor having a so-called "pipeline architecture".

In a typical data processing system, there are a significant number of electronic components and electrical interconnections between such components. It is not unusual for faults or defects to exist in at least some of the components and interconnections. Such defects affect the reliability of any processing being accomplished in the system.

There are known in the art many ways to alleviate the problems which might be caused by faults or defects. For example, strict quality assurance measures are often followed in trying to eliminate as many defective parts as is possible prior to the assembly of the system. Even so, some faults will not manifest themselves until after the system is assembled and operated. Frequently, a defect is discoverable only after the assembled system has been exercised by a test program.

Accordingly, significant efforts are often made to diagnose and correct faults or defects which may exist subsequent to the assembly of a data processing system. Generally, a test program or set of data is used in a trial run on the system and the resulting test data generated by the system is evaluated and compared, for example, with test data which is known to be good.

In a typical system, a diagnosis of the system for faults is reliable only if every line for carrying data between components in the system is checked. For example, in U.S. Pat. No. 3,771,131, issued to Andrew T. Ling, there is shown diagnostic circuitry for connection to a data processing system. The circuitry includes counters and a selection matrix for causing each test point in the data processing system to be connected to a snap or snapshot register so that when a program is run in the system, the resulting test data or signals at each test point can be stored in the snap register.

With the prevalent use of microprogramming in state-of-the-art data processing systems, it is preferable that diagnosing be accomplished by the use of diagnostic firmware or microprogramming subroutines to properly enable the snapshot registers which store the signals at selected test points. With the also prevalent use of processors having a pipeline architecture, it is also preferable that the diagnostic firmware be useable in a pipeline architecture.

One difficulty in using diagnostic firmware in a pipeline architecture is that the individual firmware commands or microinstructions that cause the "snapshot" must reach and be executed in the execute stage within the processor of the system at the exact point in time at which a snapshot is to be taken. However, if it is desired to store signals resulting from some command-under-test being processed within the system, and the desired point of time at which such signals are to be stored is the time at which the command-under-test is in the execute stage of the processor, there can be no snapshot since it is physically impossible for both the command-under-test and the snapshot command to both be in the execute stage at the same time.

SUMMARY OF THE INVENTION

In accordance with the present invention, there are provided diagnostic firmwave commands, identified as "snapshot" commands, for causing signals at various test points within a data processing system to be stored in snapshot registers for use in diagnosing faults within the system. The signals at the test points are generated in response to a command-under-test passing through the processor of the system. The snapshot commands include immediate snapshot commands which cause a snapshot to be taken at the moment that the snapshot command is executed in the execute stage of the processor, and delayed snapshot commands which delay the occurrence of the snapshot for a predetermined period of time following the execution of the snapshot command. The snapshot registers are located throughout the system, including the processor, with one or more registers generally associated with each replaceable circuit unit in the system for storing the signals at the test points in that unit. In such a manner, when a snapshot command is executed, signals at the test points in a selected replaceable circuit unit are stored in its associated snapshot register. Where it is desired that the signals be stored concurrently with the execution of a command-under-test, the command-under-test is preceded in execution by a delayed snapshot command.

In particular, there is provided in accordance with the present invention a data processing system having a processor with a plurality of stages in a pipeline architecture, with a snapshot register associated with each stage for storing data from its associated stage. Register enabling means is associated with each snapshot register for receiving an enabling signal, and in response enabling its associated snapshot register. The register enabling means includes means, such as a flip-flop, for delaying the storing of data in the snapshot register.

There is further provided in accordance with the present invention a method for diagnosing faults in a processor having a plurality of pipeline stages, the method including providing a snapshot register for each stage to store data from its associated stage, providing a register enabling circuit to enable the snapshot register, including a delay circuit to delay the enabling for a predetermined period of time, providing a command-under-test to the processor and preceeding the command-under-test by a delayed snapshot command to cause the delay circuit to delay the storing of signals by one of the snapshot registers.

It is therefore an object of the present invention to provide improved fault diagnosing in a data processing system.

It is a further object of the present invention to provide a data processing system having a pipeline processor with snapshot registers for storing the signals at selected test points in the processór.

It is still a further object of the present invention to provide a snapshot register for storing signals at test points in the execute stage of a pipeline processor.

Still a further object of the present invention is to provide a data processing system wherein a snapshot register will store the signals at test points in the execute stage of a pipeline processor, the signals being generated by a command-under-test in the execute stage.

Still a further object is to provide circuitry for delaying the storage of signals in a snapshot register, so that signals at test points in the execute stage of a processor may be evaluated for faults in the processor.

Still a further object is to provide an improved method for diagnosing faults in a pipeline processor, including the use of delayed snapshot commands for causing a delay in the storage of signals in a snapshot register.

These and other objects of the present invention will become more apparent when taken in conjunction with the attached drawings and the following description.

BRIEF DESCRIPTION OF THE DRAWINGS

FIG. 2 is a block diagram showing the primary processor of FIG. 1 in the form of a plurality of replaceable circuit units, and connected to the maintenance processor in accordance with the present invention.

FIGS. 3A and 3B are timing diagrams illustrating the flow of snapshot commands through the primary processor of FIGS. 1 and 2.

DESCRIPTION OF THE PREFERRED EMBODIMENT

Figure 1:
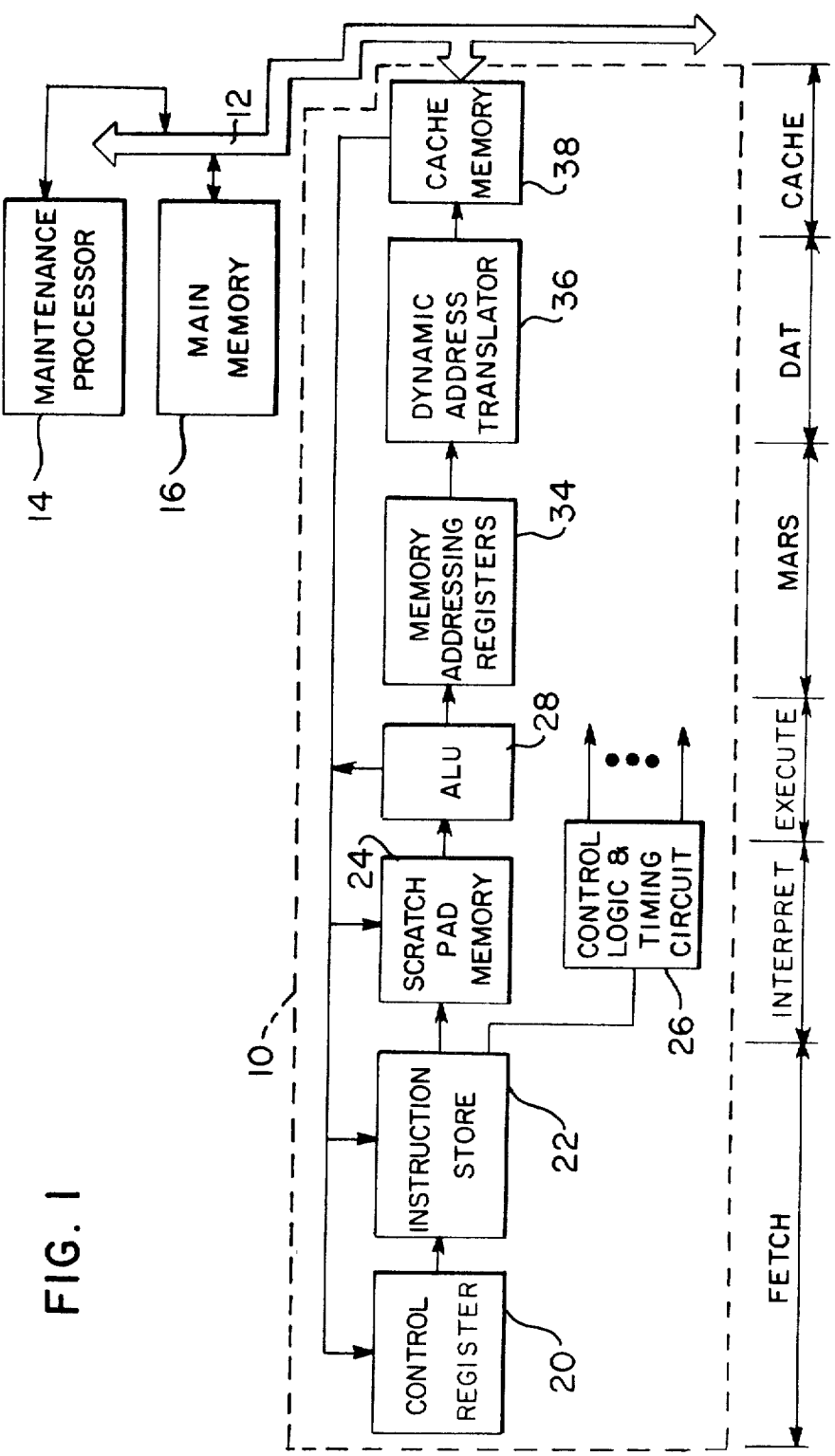
FIG. 1 is a simplified block diagram illustrating a primary processor having a pipeline architecture and a maintenance processor used for diagnosing faults in the primary processor.

Referring now to FIG. 1, there is shown a data processing system having a primary processor 10, a maintenance processor 14, and a main memory 16, all connected to an internal transfer bus 12. The term "primary processor" refers to the fact that the processor 10 performs the main processing functions of the system, such as executing most programs and directing the transfer of data to and from the main memory 16 and various input-/output devices (not shown). The maintenance processor 14, on the other hand, generally performs only certain diagnostic functions within the system, and will be described in greater detail later.

The processor 10 has a "pipeline" architecture. That is, as instructions or commands are received and executed by the processor 10, they flow or pass through several stages of the processor in a "pipeline" fashion, with each stage acting on an instruction, passing that instruction onto the next stage, and then receiving the next instruction in the pipeline. Such an architecture is well-known in the art, and considerably increases the processing capability of the system since it is unnecessary for the processing system to always wait for an instruction to be fully acted upon by the entire processor before the next instruction can be received and acted on by the processor.

Still referring to FIG. 1, there are shown the six interconnected stages of the primary processor 10. These six stages are labeled "FETCH", "INTERPRET", "EXECUTE", "MARS", "DAT", and "CACHE". The FETCH stage includes a control register 20 and an instruction store 22, the INTERPRET stage includes a scratch pad memory 24 and a control logic and timing circuit 26, the EXECUTE stage includes an arithmetic-logic unit (ALU) 28, the MARS stage includes memory addressing registers 34, the DAT stage includes a dynamic address translator 36, and the CACHE stage includes a cache memory 38.

The operation of a processor having a pipeline architecture, such as the processor 10, is well-known in the art. Briefly, the control register 20 will first receive, from an instruction stored in cache memory 38, the address of a firmware subroutine stored in the instruction store 22. When the selected subroutine is addressed by the control register 20, each firmware command or microinstruction of the selected subroutine in the instruction store 22 will provide, to the control logic and timing circuit 26, an op code (operation code) which will designate the type of operation to be performed, such as fetching data to be stored in the scratch pad memory 14 or operating on data already held in the scratch pad memory. The control circuit 26 provides the necessary control and timing signals within the processor in order to assure the proper sequence of events necessary to execute each microinstruction. When data is to be operated on, the data will normally be provided by the scratch pad memory 24 to the ALU 28. The ALU operates on the data and stores the result in the scratch pad memory. A subsequent memory store operation will move the data from the scratch pad memory to the cache memory 38.

When a memory fetch or store operation is to be performed, the ALU directs a memory address from, for example, the scratch pad memory 24 through the ALU 28 to the memory addressing registers 34. The address provided to the memory addressing registers 34 may either be real or virtual. If a virtual address, the dynamic address translator 36 converts the address into a real address of data stored in the cache memory 38 or the main memory 16. The cache memory 38 is a high-speed memory that stores data, instructions or the like, and that can be rapidly accessed when its contents are needed within the processor 10. The cache will normally store the more frequently used data from the slower main memory 16 in order to increase the operating speed of the system.

As mentioned earlier, the maintenance processor 14 generally performs the diagnostic operations carried on within the system. These diagnostic operations may include transmitting test programs or subroutines along bus 12 to the processor 10 and monitoring the results to determine if a fault exists. The maintenance processor 14 will often detect a fault by comparing the results of a test subroutine to known good results.

The data processing system as thus far described, including the primary processor 10 and maintenance processor 14, is well known in the art and forms no part of the present invention. Such a system is commercially available, for example, in the Criterion 8500 series of computer systems sold by NCR Corporation, Dayton, Oh.

Turning now to FIG. 2, there is illustrated in block diagram form the processor 10 as it might appear to one who looks at the actual physical components of the system. As can be seen in FIG. 2, the processor 10 is comprised of a plurality of replaceable circuit units 50. The replaceable units 50 are labeled No. "1" through No. "n" in the drawings and would, in an actual data processing system, each be comprised of a printed circuit board with circuit components mounted thereon for performing the necessary processing operations. If a defect or fault is detected in the system, such as by the diagnostic operations of the maintenance processor 14, the replaceable circuit unit 50 where the fault is detected can simply be replaced by a new replaceable circuit unit. This is easily accomplished where the replaceable circuit units are each a printed circuit board having mounted circuit components, by pulling out the defective circuit board and replacing it with a new circuit board having identical circuit components.

For purposes of describing the preferred embodiment of the present invention, it is assumed that there are six replaceable circuit units 50, with one replaceable circuit unit 50 corresponding to each one of the six stages FETCH, INTERPRET, EXECUTE, MARS, DAT, and CACHE shown in FIG. 1. However, it should be appreciated that in an actual processor, there may be more than one circuit board or replaceable circuit unit per stage, or alternatively, more than one stage of the processor on each replaceable circuit unit.

Each replaceable circuit unit 50 has associated therewith a snapshot circuit 56. The snapshot circuit 56 includes, as will be described in greater detail later, a snapshot register that will store signals occurring at selected test points within its associated replaceable circuit unit 50, with the storage occurring when the snapshot circuit 56 receives control signals generated by the control logic and timing circuit 26 of FIG. 1. After the signals have been stored in each of the snapshot circuits 56, they can be transferred from each of the snapshot circuits 56 to the maintenance processor 14 by way of a multiplexer 58 over a serial service bus 60. The multiplexer 58 serially receives the signals from the snapshot circuits and loads the signals, from one snapshot circuit at a time, onto bus 60 for evaluation by the maintenance processor 14. Bus 60, which is shown only in FIG. 2, provides a separate serial link between processor 10 and maintenance processor 14, and is used only during diagnostic operations.

Although it is assumed for purposes of the present description that each replaceable circuit unit 50 has only one associated snapshot circuit 56, it should be appreciated that there could be more than one snapshot circuit, depending upon the number of test points in the replaceable circuit unit.

FIGS. 3A and 3B illustrate the manner in which a command-under-test (CUT) that has been provided by the maintenance processor 42 passes through the processor 10 and the manner in which the resulting signals at each stage in the processor 10 are stored in the snapshot circuits 56.

Generally, when repetitive errors appear in the data being processed in the system, the processor 10 will stop executing the programs stored in the main memory 16 and the system will go into a diagnostic mode. In the diagnostic mode, the maintenance processor 14 will load the instruction store 22 with a firmware subroutine that includes a CUT and the necessary snapshot commands for storing the signals resulting from the CUT at each of the stages in the processor 10, as well as at any other test points in the system.

Referring specifically to FIG. 3A in conjunction with FIG. 1, there is shown the progression of a CUT through each of the six stages during time periods $t_1$ through $t_6$. Each time period can be thought of as one machine or clock cycle in the operation of the processor. The CUT is preceded by two snapshot commands (SNP's) and followed by three snapshot commands. Each snapshot command is delivered to and decoded by the control circuit 26 in the INTERPRET stage of the processor 10, and when reaching the EXECUTE stage, causes the snapshot circuit at one of the replaceable circuit units 50 to store the signals at the test points in that unit.

In FIG. 3A at time $t_1$, the first snapshot command reaches the EXECUTE stage of the processor and the execution of the snapshot command causes the snapshot circuit associated with the FETCH stage of the processor to store the test point signals generated by the CUT in the FETCH stage. At time $t_2$, the second snapshot command reaches the EXECUTE stage and causes the snapshot circuit associated with the INTERPRET stage of the processor to store the signals at the test points in the INTERPRET stage of the processor. At time $t_3$, the CUT reaches the EXECUTE stage; however, at this point in time a snapshot will not be taken of any signals generated by the CUT since a snapshot command and the CUT cannot both occupy the EXECUTE stage at the same time. The result is that signals at any of the test points in the processor during the time that the CUT is in the EXECUTE stage cannot be stored for later diagnostic use by the maintenance processor 14.

At times $t_4$, $t_5$ and $t_6$ in FIG. 3A, the CUT prgresses to the MARS stage, DAT stage and CACHE stage, with the three snapshot commands following the CUT causing the signals at selected test points in the replaceable circuit units corresponding to the MARS, DAT, and CACHE stages to be stored in their associated snapshot circuits.

It can be seen from the preceding discussion that in a processor having a pipeline architecture, a snapshot command received by the processor will be unable to cause the signals at test points in the EXECUTE stage to be stored when the command-under-test reaches the EXECUTE stage. While in many circumstances the processor may be sufficiently exercised by the command-under-test so that test data at the EXECUTE stage may be unnecessary for a thorough diagnosis by the maintenance processor 14, it is still often desirable that the maintenance processor receive test data from the EXECUTE stage.

In FIG. 3B, there is illustrated the progression of snapshot commands and a CUT through the processor 10 for the same time periods $t_1$-$t_6$ that were illustrated in FIG. 3A and for a preceding time period $t_0$. However, in FIG. 3B the CUT is preceded by three delayed snapshot commands ($SNP_D$). These delayed snapshot commands will cause, in accordance with the present invention, the generation of the necessary control signals and the resulting storage of signals or test data to occur one cycle after the execution of the snapshot command.

Looking now at FIG. 3B, one can see that the CUT is preceded by three delayed snapshot commands. At time $t_0$, the CUT has not yet reached the FETCH stage of the processor, but the first delayed snapshot command is being executed in the EXECUTE stage. As mentioned above, however, the control signals resulting from the executed delayed snapshot command do not at that point cause the snapshot to be taken. At time $t_1$ the CUT reaches the FETCH stage of the processor, and the delayed action of the first delayed snapshot command, which is now in the MARS stage, will cause the snapshot circuit associated with the FETCH stage to store the test data resulting from the CUT being in the FETCH stage. Also at time $t_1$, the second delayed snapshot command is being executed. At time $t_2$, the CUT reaches the INTERPRET stage, and the second delayed snapshot command, which was executed at time $t_1$, causes the test data at the INTERPRET stage to be stored. At time $t_3$, the CUT is in the EXECUTE stage and the third delayed snapshot command, which was executed at time $t_2$, causes the test data in the EXECUTE stage to be stored.

The CUT illustrated in FIG. 3B is followed by three immediate snapshot commands, i.e., snapshot commands that are not delayed, such as those shown used both before and after the CUT in FIG. 3A. Thus, when the CUT reaches the MARS stage at time $t_4$ in FIG. 3B, the snapshot command then in the EXECUTE stage causes the test data at the MARS stage to be stored. Similarly, the last two snapshot commands cause the test data associated with the CUT in the DAT and CACHE stages at times $t_5$ and $t_6$ to be stored.

By the use of three preceeding delayed snapshot commands and then three following immediate snapshot commands, as illustrated in FIG. 3B, it can be seen that the signals at test points resulting from the command-under-test at every stage, including the EXECUTE stage, can be stored in the snapshot circuits 56 and then can be later evaluated by the maintenance processor 14.

Figure 4:
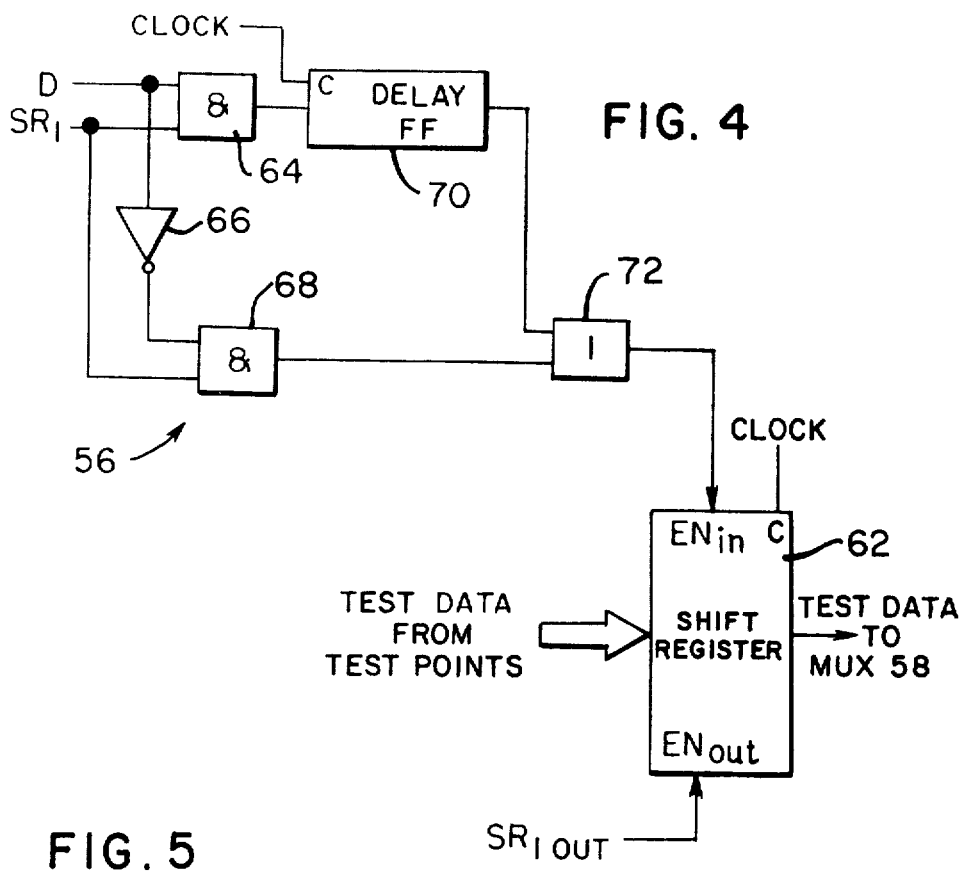
FIG. 4 is a detailed circuit block diagram of the snapshot circuit within one of the replaceable circuit units shown in FIG. 2.

FIG. 4 shows the circuitry that would be found in each snapshot circuit 56. In particular, FIG. 4 shows the circuitry within the snapshot circuit associated with replaceable circuit unit No. 1 of FIG. 2, and the signals received by that snapshot circuit that enable it to store test data or signals.

The snapshot circuit 56 includes a snapshot shift register 62 having parallel data inputs for receiving the test data or signals from selected test points in replaceable circuit unit No. 1. The shift register 62 also includes a control input $EN_{in}$, which enables the shift register to store the signals at its parallel data inputs, a control input $EN_{out}$ which enables the data stored in the shift register 62 to be outputted in a serial fashion at the data output of the shift register, and a clock input C. The shift register 62 can be an 8-bit parallel-in serial-out shift register, such as Circuit No. 100141 sold by Fairchild Camera and Instrument Corporation, Mountain View, California.

The illustrated snapshot circuit 56 receives two control signals D and $SR_1$ which determine the nature of the signal at the $EN_{in}$ input of the shift register 62. The $SR_1$ signal determines whether or not an enabling signal will be delivered to the $EN_{in}$ input of the shift register 62, and the signal D determines whether or not the enabling signal delivered to the $EN_{in}$ input is delayed. The D signal is delivered directly to one input of an AND gate 64 and, by way of an inverter 66, to one input of an AND gate 68. The $SR_1$ signal is delivered directly to a second input of each of the AND gates 64 and 68. The output of AND gate 64 is connected to the input of a delay flip-flop 70. The output of the flip-flop 70 and AND gate 68 are delivered to the inputs of an OR gate 72. The output of the OR gate 72 is delivered to the $EN_{in}$ input of the shift register 62.

It should be apparent from the foregoing description and FIG. 4 that, regardless of whether D is at a "1" or a "0", when the $SR_1$ signal is at a logic level "1", the output of one of AND gates 64 and 68 and, as a consequence, the output of OR gate 72 will go to a "1" and enable the $EN_{in}$ input of shift register 62. However, the timing of the enabling signal to the $EN_{in}$ input of shift register 62 will depend upon the value of the D signal. If D is at a logic level "1", the output of AND gate 64 is at a "1", and the output of AND gate 68 is at a "0". The "1" delivered to the OR gate 72 from AND gate 64 is delayed momentarily by the delay flip-flop 70. The delay flip-flop 70 is a well-known D-type flip-flop and is clocked by the same clock signal as the processor 10 and shift register 62, so that the amount of delay will generally correspond to one cycle of the processor. When enabled through the flip-flop 70, the shift register 62 stores the test data at its parallel data inputs from the test points one cycle after the control signals D and $SR_1$ are delivered to the snapshot circuit 56.

If D is at a logic level "0", the output of AND gate 64 is at a "0", and the output of AND gate 68 is at a "1". The "1" from AND gate 68 is delivered through OR gate 72 to the $EN_{in}$ input of shift register 62 without delay, and the shift register is thus immediately enabled to receive test data at its parallel data inputs.

The shift register 62 also receives an enabling signal $SR_{1out}$ at its $EN_{out}$ input for purposes of serially shifting the stored data out its serial data output to the maintenance processor 14 by way of the multiplexer 58 and bus 60 (FIG. 2). The $SR_{1out}$ signal can be generated by the maintenance processor when it is ready to receive and evaluate the test data.

Figure 5:
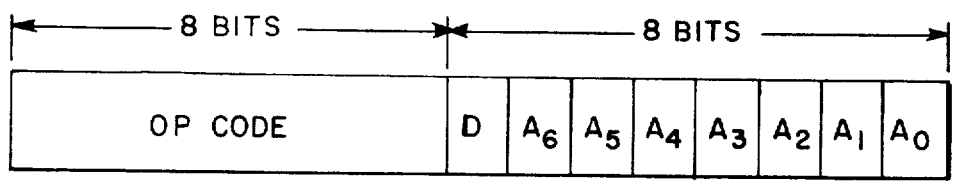
FIG. 5 illustrates the format of a snapshot command in accordance with the present invention.

FIG. 5 illustrates the format of a snapshot command that will be stored within the instruction store 22 and that will cause one of the snapshot circuits 56 to store test data at the test points in one of the replaceable circuit units 50. As seen in FIG. 5, the snapshot command is comprised of two 8-bit bytes. The eight bits on the left as viewed in FIG. 5 are the op code of the command, which generally indicates to the control logic and timing circuit 20 of the processor 10 the nature of the command to be performed. The eight bits on the right include address bits ($A_0$–$A_6$) indicating the particular snapshot circuit which is to be enabled to store test data, and the bit D that, as discussed above with reference to FIG. 4, indicates whether the snapshot is to be delayed or not. The address bits $A_0$–$A_6$ are delivered to and decoded by the control logic and timing circuit 20, and result in a signal, such as the $SR_1$ in FIG. 4, delivered along control lines (not shown) to each of the snapshot circuits 56.

Although the presently preferred embodiment of the invention has been described, it should be understood that within the purview of the invention various changes may be made within the scope of the appended claims.

What is claimed is:

1. In a data processing system of the type having a processor with a plurality of stages in a pipeline architecture, diagnostic circuitry for use in detecting faults in said processor comprising:
   at least one register associated with each of said stages for storing data from its associated stage; and
   register enabling means associated with at least each of said stages, said register enabling means for receiving a signal for enabling said register of its associated stage to store data and including means for delaying the storing of data in said register for a predetermined period of time following the receipt of the enabling signal.

2. The data processing system of claim 1, wherein said means for delaying includes a flip-flop for storing the enabling signal so that the storing of data by said register occurs in the processor cycle following receipt of the enabling signal by said register enabling means.

3. A data processing system, comprising:
   a primary processor having a plurality of stages arranged in a pipeline fashion, including an execute stage;
   a memory connected to said primary processor for storing data for use by said primary processor;

a snapshot register associated with the execute stage for storing signals generated within the execute stage; and snapshot register enabling means for receiving an enabling signal and in response enabling said snapshot register, including means for delaying the storage of signals in said snapshot register for a predetermined period of time following the receipt of the enabling signal.

4. The data processing system of claim 3, further comprising:

a maintenance processor connected to said primary processor for receiving the signals stored within said snapshot register and evaluating the signals for faults in said primary processor.

5. The data processing system of claim 4:

wherein said snapshot register comprises a parallel-in serial-out shift register, with the data inputs of said shift register connected to receive signals from test points within the execute stage and with the data output of said shift register connected to deliver the test point signals to said maintenance processor.

6. The data processing system of claim 3, further comprising means for providing to said snapshot register enabling means a delay signal for indicating whether there should be a delay in the storage of signals in said snapshot register, and wherein:

said snapshot register enabling means includes logic means for receiving the enabling signal and for receiving the delay signal; and said means for delaying includes a flip-flop connected to said logic means for delaying the enabling of said snapshot register in response to the delay signal.

7. The data processing system of claim 6:

wherein said logic means compises a first AND gate for receiving the enabling signal and the delay signal and for providing the signal at its output to said flip-flop, an inverter for also receiving the delay signal, a second AND gate for receiving the enabling signal and the output of said inverter, and an OR gate connected for receiving the output of said second AND gate and the output of said flip-flop, and connected for providing the signal at its output to an enabling input of said snapshot register.

8. In a method for diagnosing faults in a processor having a plurality of pipeline stages, including an execute stage, a method for obtaining test data, comprising:

providing a plurality of snapshot registers, with at least one of the snapshot registers associated with each stage in the processor for temporarily storing data from its associated stage;

providing a register enabling circuit for each of the snapshot registers for receiving an enabling signal and in response enabling its associated snapshot register, including a delay circuit for delaying the enabling for a predetermined period of time following receipt of the enabling signal;

providing a command-under-test to the processor which results in data at selected test points in each stage for storage in one of the snapshot registers; and preceding the command-under-test by a delayed snapshot command, the delayed snapshot command generating the enabling signal to enable the one of the snapshot registers associated with the execute stage of the processor and causing the delay circuit associated with that snapshot register to delay the enabling of that snapshot register until after the snapshot command leaves the execute stage so that the snapshot register stores the data associated with the execute stage and generated by the command-under-test.

* * * * *